United States Patent [19]

Matsunaga

[11] Patent Number: 5,309,226
[45] Date of Patent: May 3, 1994

[54] MEANS FOR CANCELLING GHOST SIGNALS IN RESPONSE TO THE RECEPTION OF A NON-STANDARD TELEVISION VIDEO SIGNAL

[75] Inventor: Mitsuhiro Matsunaga, Tokyo, Japan

[73] Assignee: NEC Corporation, Japan

[21] Appl. No.: 936,796

[22] Filed: Aug. 28, 1992

[30] Foreign Application Priority Data

Aug. 30, 1991 [JP] Japan .................................. 3-220031

[51] Int. Cl.⁵ .............................................. H04N 5/21
[52] U.S. Cl. .................................................... 348/614
[58] Field of Search ................... 358/167, 36, 37, 166, 358/905; H04N 5/21, 5/213

[56] References Cited

U.S. PATENT DOCUMENTS

| | | | |
|---|---|---|---|
| 4,953,026 | 8/1990 | Kobayashi et al. ................. | 358/167 |
| 5,065,241 | 11/1991 | Isa ....................................... | 358/166 |
| 5,170,260 | 12/1992 | Tabata ................................. | 358/167 |

FOREIGN PATENT DOCUMENTS

| | | | |
|---|---|---|---|
| 3-132166 | 6/1991 | Japan ............................... | H04N 210 |
| 3-169168 | 7/1991 | Japan ............................... | H04N 210 |

Primary Examiner—Victor R. Kostak
Assistant Examiner—Nathan J. Flynn
Attorney, Agent, or Firm—Laff, Whitesel, Conte, Saret

[57] ABSTRACT

A ghost canceller for cancelling the ghost with dummy ghost signals opposite in characteristics to the ghost signals. Such dummy ghost signals are generated under control of tap gain controls signals and delay control signals generated by analysis of received TV video signals. The filter control circuit in the ghost canceller comprises a standard signal discriminator for discriminating whether the relationship among the subcarrier signal, and the vertical and horizontal synchronizing signals of the input video signal meets the above-mentioned standards or not; and a zero gain signal generator for otherwise setting the tap gain control signal of the ghost cancelling filter to the corresponding value to zero tap gain.

In virtue of this construction, the input of nonstandard TV signal unmeet for the standards results in zero tap gain of the transversal filter, and thus the input signal passes, as unaffected, through the ghost filter, and then outputted. In this may malfunction as occurrence of image distortion can be prevented and therefore clear pictures are obtained.

5 Claims, 5 Drawing Sheets

MEANS FOR CANCELLING GHOST SIGNALS IN RESPONSE TO THE RECEPTION OF A NON-STANDARD TELEVISION VIDEO SIGNAL

BACKGROUND OF THE INVENTION

1. Field of the Invention

This invention relates to a ghost cancelling circuit and more particularly to the same for cancelling ghost which is multiple images on a TV screen arising from multipath signals.

2. Description of the Prior Art

When video signal is radiated from a transmitting station, the TV receiver receives the direct wave from there to the antenna and the reflected waves from building, mountain, airplane, etc. The reflected waves cover longer paths than the direct wave and hence are lower in signal level and delayed. Owing to generally receiving multipath signals including the many reflected, extra faint multiple images called ghost are produced in the horizontal vicinity of the desired image. Lowering of picture quality due to ghost is called ghost trouble.

In the prior art, ghost cancelling circuits for reducing or cancelling such ghost, as described, for example, in U.S. Pat. No. 4,953,026 (Ref. 1), comprises a ghost cancelling filter consisting of a variable or controllable delay circuit, and a transversal filter. Using the ghost cancelling filter a dummy ghost waveform is generated under the conditions where the delay time by the variable delay circuit and the tap gain by the transversal filter are so controlled that the dummy ghost waveform has the inverted characteristics to the ghost waveform, and then added to the input TV signal.

Besides in U.S. Pat. Nos. 4,897,725 (Ref. 2) and 4,947,252 (Ref. 3), Japanese Laid-Open Application No. Sho. 62-181579, and a paper "Development of a Ghost Cancel Technology for TV Broadcasting", NAB Engineering Conference Proceedings 1990, pp. 229–238 (Ref. 4) is described a ghost cancelling circuit for NTSC signals, and ghost cancel reference (GCR) signals are inserted in the received video signals during the vertical blanking time. In the circuit of Ref. 2 as typical example of these conventional ghost cancelling circuits. A Fourier transform of the difference between the GCR signal and the previously stored standard waveform of the GCR signal is obtained, and then inverse Fourier transform of the resulting Fourier transform is obtained. Thereby the delay time and tap gain of the ghost cancelling filter are set.

Ghost cancellation technique by insertion of GCR signals will be more detailed below. In broadcasting stations, GCR signals are inserted during the vertical blanking time of NTSC signals as described above. In the receiver, the GCR signals including ghost are extracted from the received signals, and the waveform distortion of them are analyzed to obtain the characteristics of the ghost. The analysis consists of Fourier transform of the difference between the received GCR signal and the reference waveform of the previously stored GCR signal and then the inverse Fourier transform of the resultant Fourier transform as described Refs. 3 and 4. The output of the inverse transform controls the delay and tap gain of the ghost cancelling filter, and under this conditions, the filter exhibits a pass characteristic of deleting the amplitude of the received ghost on the time axis. The received signals therefore are passed through the ghost cancelling filter to filter the ghost from them. The ghost cancelling filter is composed of a nonrecursive filter part for cancelling nearby-ghost and a recursive filter part for cancelling the other ghosts as described in Ref. 3. As well-known, these filter parts are a digital filter consisting of an adder, a coefficient multiplier, and a unit-delay component. Nonrecursive filter is also called transversal filter.

Those ghost cancelling circuits in the prior art is used for television signals of NTSC system or similar standards (referred to as standard signals hereinafter) regardless less of whether the GCR signals are inserted or not. TV signals from which ghost can be canceled by these cancelling circuits are of NTSC system or similar standards including subcarrier signal (frequency $f_{sc}=3579545\pm10$ Hz for NTSC system), and besides horizontal synchronizing signal (frequency $f_H=2\times f_{sc}/455=15.734$ KHz for NTSC) and vertical synchronizing signal (frequency $f_v=2f_H/525=59,94$ Hz for NTSC) synchronous in phase with the subcarrier signal.

When non-standard signals other than the standard signals are input, the ghost cancelling operation can not be caused under the condition of having established the synchronism with the TV signals because the time base for waveform analysis is different from the standard signals. On the other hand, practically TV receivers on which non-standard signals as of video cassette recorder (VCR), laser disk (LD) player, and television game are much displayed, and therefore which is provided with a conventional-type ghost cancelling circuit can not reproduce these non-standard signals as normal TV pictures when input.

SUMMARY OF THE INVENTION

It therefore is the principal object of the present invention to provide a ghost cancelling circuit by which, when standard TV signals are input, the associated ghost is canceled and when non-standard TV/video signals are input as from VCR or the like, ghost cancelling processing is not made to output input signals to be output as they are.

It therefore is the principal object of the present invention to provide a ghost cancelling circuit permitting input signals, when they are standard TV signals, to have ghost canceled by it, and when they are non-standard TV signals or video signals as from VCR or the like, to output as they are without being subjected to ghost cancelling.

A ghost cancelling circuit according to the present invention comprises a A/D converter for converting received TV video signal to digital video signals;

A ghost cancelling filter consisting of a transversal filter, the tap gain thereof being controlled by tap gain control signals, a variable delay circuit, the delay thereby being controlled by delay control signals, and an adder for adding the output of said transversal filter to said digital video signals; and a filter control circuit including a timing signal source for generating a set of timing signals in response to said vertical and horizontal synchronizing signals and color subcarrier from said video signal, an extractor for extracting from said digital video signals the associated representative ghost signals in response to said timing signals, a tap gain control signal generator responding to said associated ghost signals, and a delay control signal generator responding to said associated ghost signal, and in addition a standard signal discriminator for discriminating whether said video signal meets the standards of the standard broadcasting system such as NTSC or not in response to said horizontal, vertical synchronizing signals and said color subcarrier, a setting circuit for setting said tap gain control signal to the corresponding value to a tap gain zero unless the output of said discriminator indicate to meet said standards.

Thus if non-standard TV signal is input, the tap gain of transversal filter is set to zero thereby, and thus the input signal is outputted as it is through the ghost cancelling filter.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1:
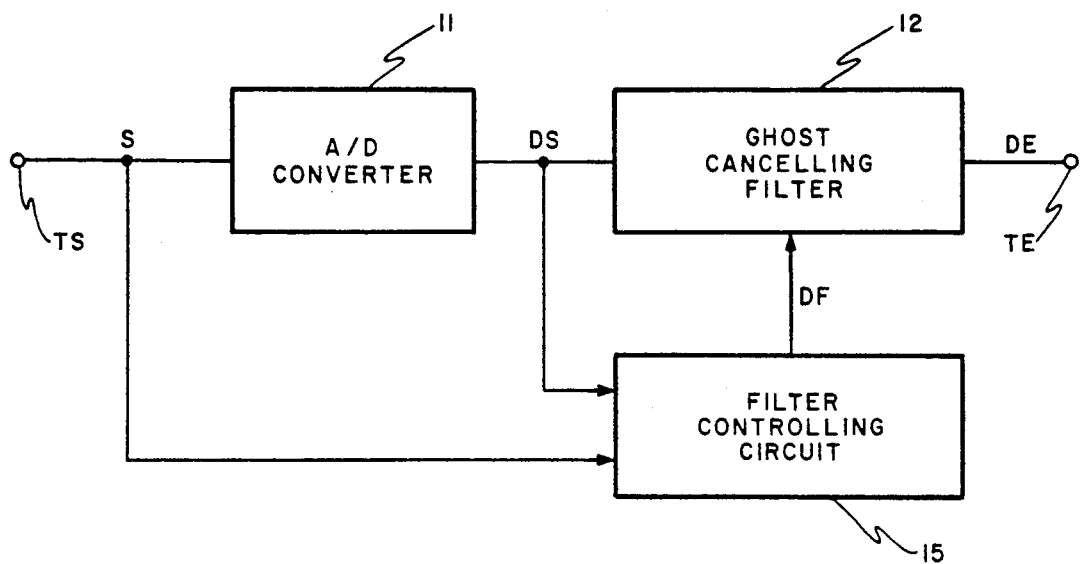
FIG. 1 is a block diagram of a general ghost canceller.

Referring to FIG. 1, a common ghost cancelling circuit, of which general block diagram is given in FIG. 1, comprises an A/D converter 11 for converting analog video signal S containing ghost from an input terminal TS to digital video signals DS, a ghost cancelling filter 12 for eliminating ghost and outputting ghost-free video signals DE, and a filter controlling circuit 15 for receiving analog signal S and digital signals DS and outputting control signals DF described later to the ghost cancelling filter 12.

Figure 2:
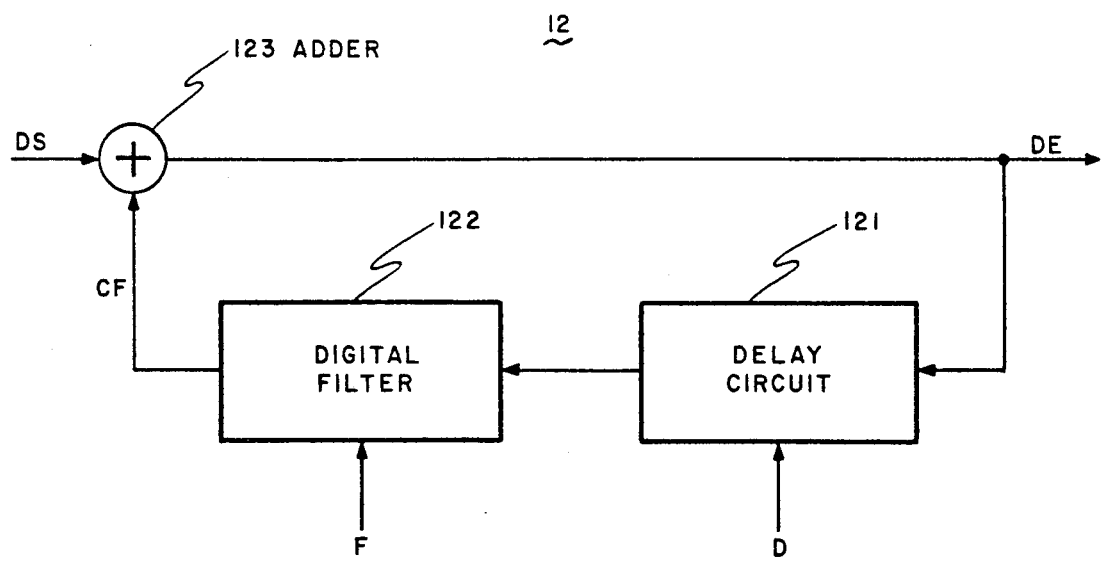
FIG. 2 is a block diagram of a general ghost cancelling filter included in the ghost canceller of FIG. 1.
Figure 3:
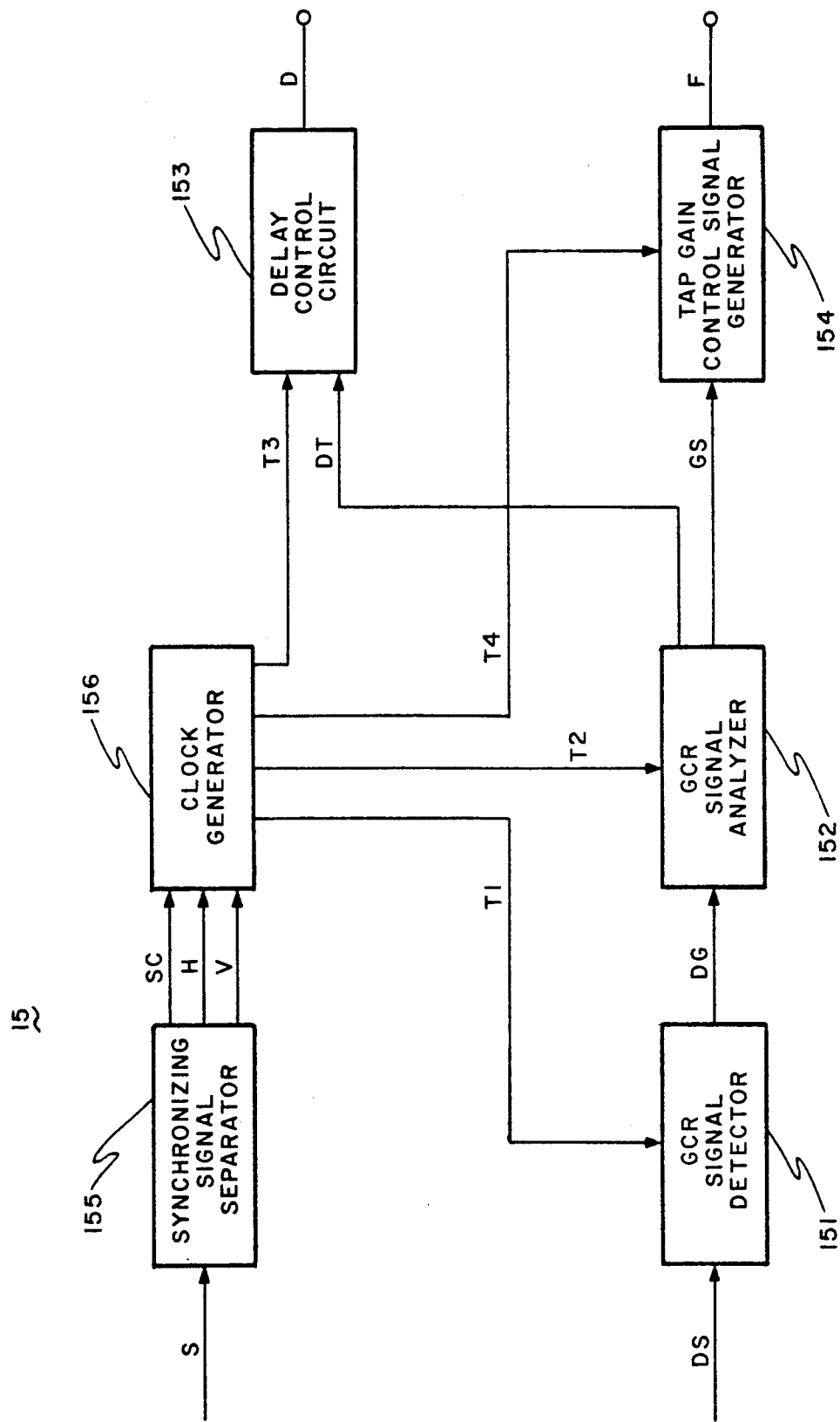
FIG. 3 is a block diagram of a conventional filter controlling circuit included in the ghost canceller of FIG. 1.

Referring to FIGS. 2 and 3, each diagramming in more detail the ghost cancelling filer 12 and the filter controlling circuit 15, respectively, description will be given under. The filter controlling circuit 15 comprises a GCR signal detector 151 for extracting the GCR signal DG from digital video signals DS, a GCR signal analyzer 152 for giving Fourier transform of GCR signals DG and outputting ghost signals GS, a delay controller 153 for providing delay D to the ghost cancelling filter 12, a tap gain control signal generator 154 for outputting a tap gain F to a digital filter part 122 of the ghost cancelling filter 12 in response to ghost signals GS, a synchronizing signal separator 155 for extracting vertical and horizontal synchronizing signals, V, H, and subcarrier signal SC from input analog video signal S, and a clock generator 156 for generating a clock CK synchronous with signals V and H, having a frequency four-times higher than subcarrier signal SC, and locked in phase with the color burst signal, and in addition clock signals T1 to T4 each being supplied to GCR signal detector 151, GCR signal analyzer 152, delay controller 153, and tap gain control signal generator 154, respectively.

Referring to FIG. 2, ghost cancelling filter 12 is constructed of a variable delay circuit 121 for delaying digitized video signals DS, a digital filter 122 which is a transversal filter controllable with tap gain F, and an adder 123 for adding the output of digital filter 122 to digitized video signal DS and outputting the resulting ghost-cancelled video signal DE.

Figure 5:
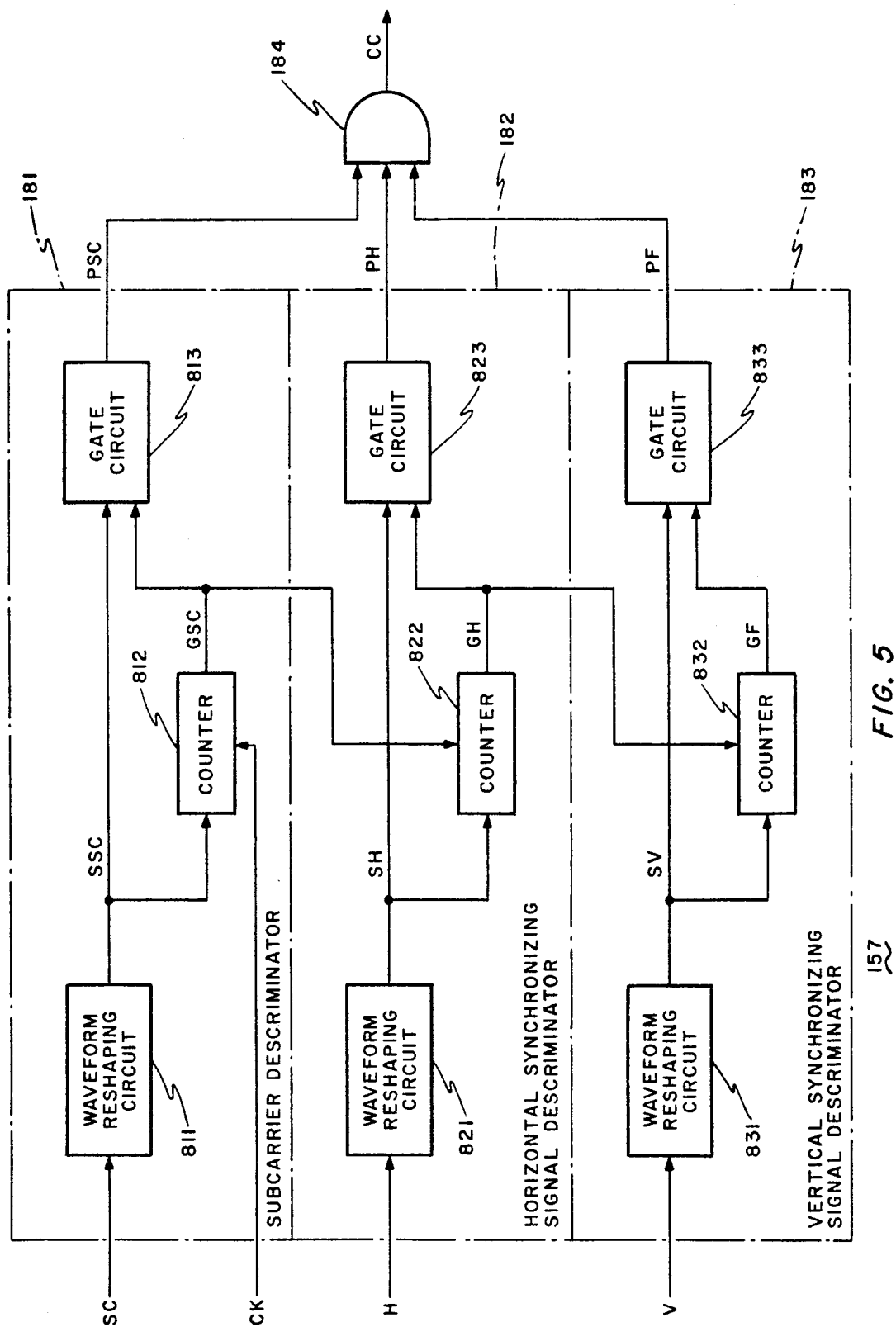
FIG. 5 is a block diagram of a standard signal discriminator which is a part of the filter controlling circuit of FIG. 4.
Figure 6A:
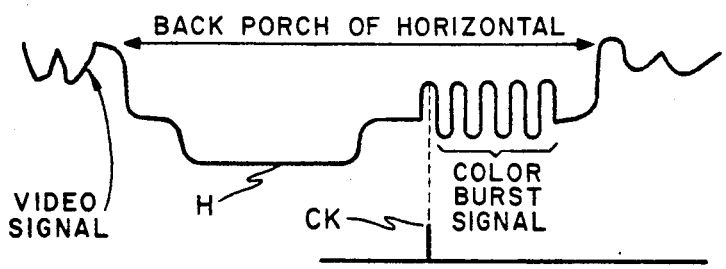
FIG. 6A is a waveform diagram and FIGS. 6B through 6D are timing diagram illustrative of the operation of the standard signal discriminator of FIG. 5.
Figure 6B:
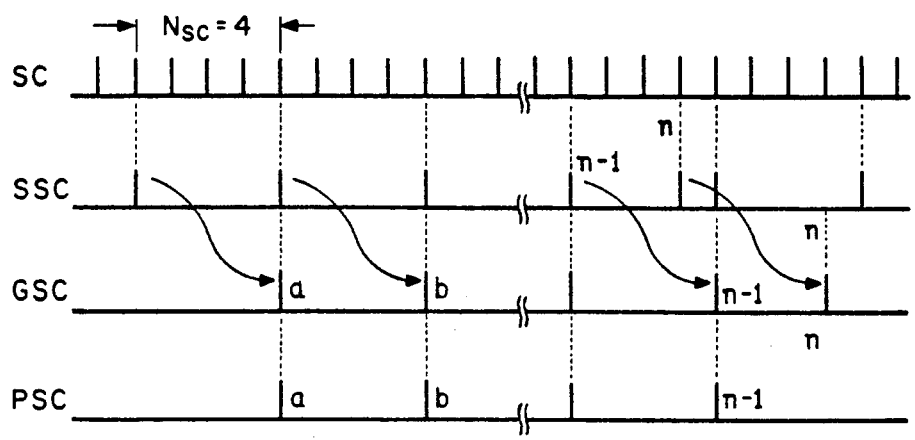
Figure 6C:
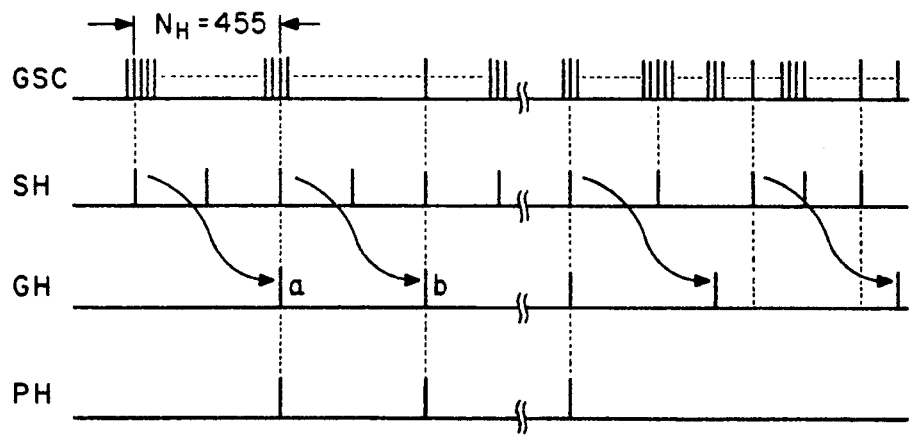
Figure 6D:
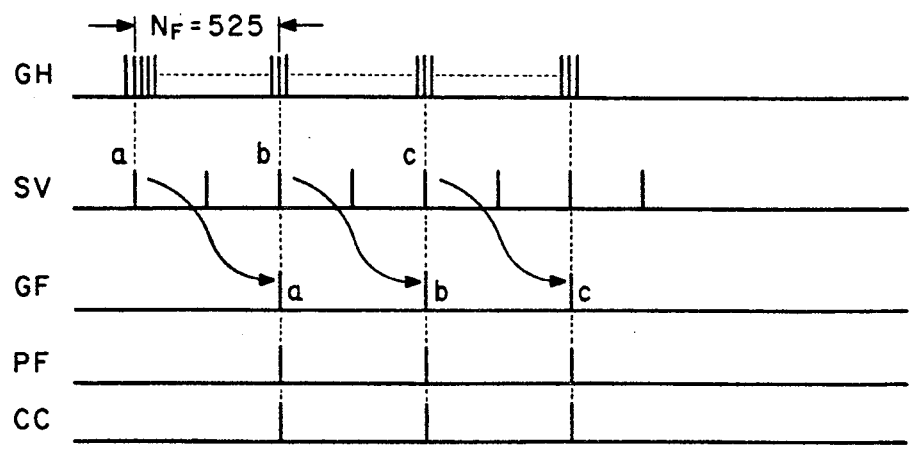

The constructions of circuits 12 and 15 described above are correspondent to the combination of the ghost cancelling filter in FIG. 5 of Ref. 1 and a tap gain control circuit in FIG. 1 of Ref. 2, and description of the correspondent components is given in Refs. 1 and 2, and therefore omitted.

In the above-described ghost cancelling circuit, analog video signal S from input terminal TS is input to A/D converter 11 and filter controlling circuit 15. In the latter, the video signal S is separated through synchronizing signal separator 155 into vertical and horizontal synchronizing signals, V, H, the separated signals being used as time base for clock generator 156. The clock generator 156 outputs clock signals T1 to T4 synchronous with signals V and H. GCR signal detector 151 outputs digitized GCR signals DG from digital video signals DS to GCR signal analyzer 152. The difference between the standard GCR signal waveform and the waveform of practically received GCR signal corresponds to the ghost, and on the basis of this, GCR signal analyzer 152 detects this difference between the waveform of signal DG and the previously stored standard waveform, followed by provision of Fourier transform of the difference. After high band correction, and the like, for preventing beat trouble as described in Ref. 2, the following process is inverse Fourier transform, which is outputted as the ghost signals GS to tap gain control signal generator 154. At the same time, GCR signal analyzer 152 outputs also digital signal DT indicating delay of GCR signal to delay control circuit 153 which generates delay control signals D obtained from digital signals DT and supplies them to delay circuit 121. Tap gain control signal generator 154 outputs to digital filter 122 tap gain control signals F obtained from ghost signal GS.

In ghost cancelling filter 12, digitized video signals DE are passed through delay circuit 121 to delayed by D, and then input to digital filter 122 which outputs signal CF under the control of tap gain control signal F. The output CF of this filter has the same amplitude as and the opposite polarity to the distorted waveform due to the ghost of digital video signals DS. Hence if input to adder 123, it is added to signal DS, with the result of cancelling the ghost, thus ghost-free digitized video signals DE is obtained.

Figure 4:
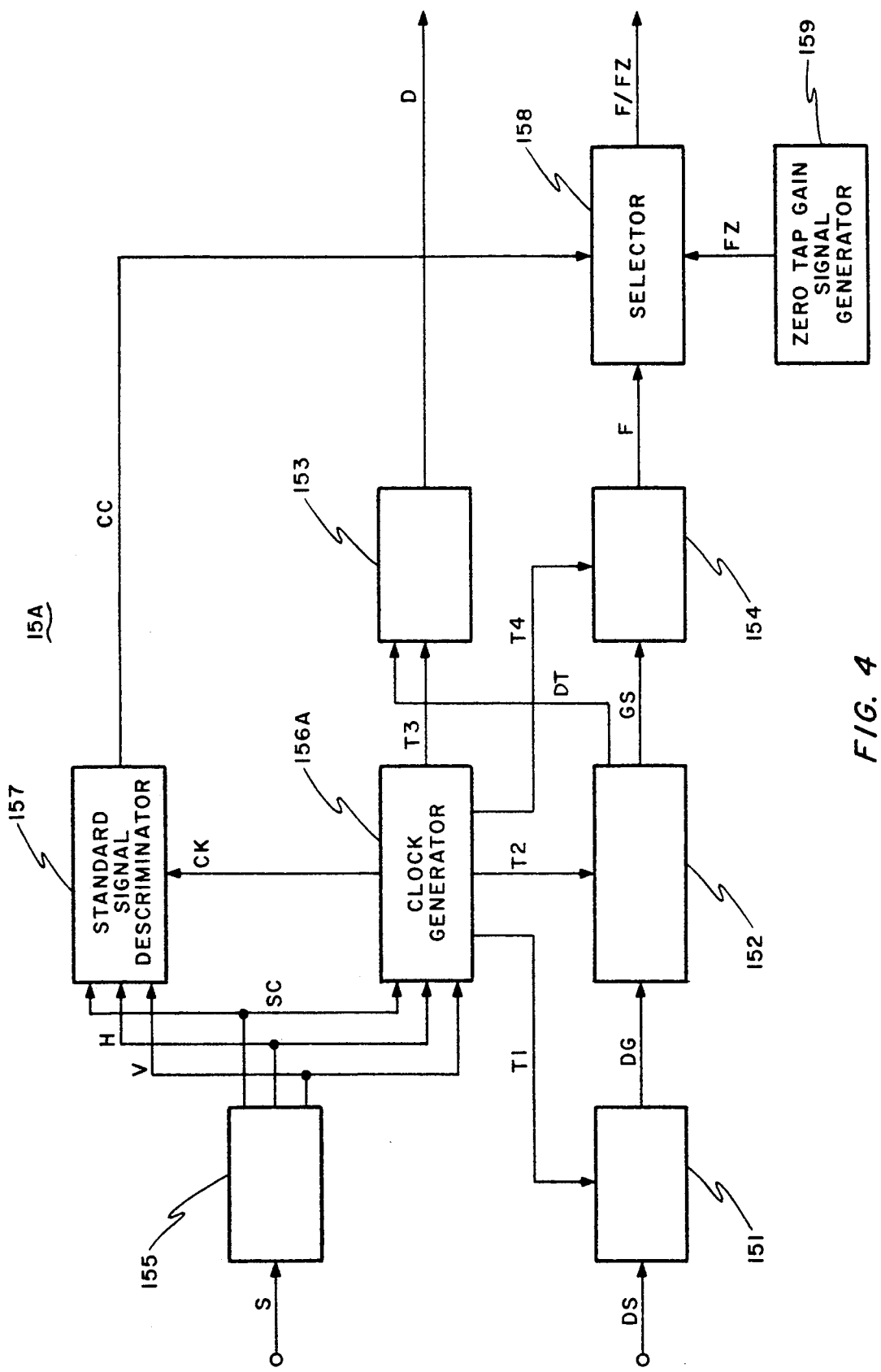
FIG. 4 is a block diagram of a filter controlling circuit according to the present invention.

Referring to FIG. 4, as shown in the form of a block diagram therein, a filter control circuit 15A by which the present invention is characterized comprises in addition to above-described circuit components 151 to 155 of the filter control circuit 15, a clock generator 156A (instead of the above-mentioned clock generator 156) for generating not only the above-mentioned clocks T1 to T4 but also clock CK having a frequency four-times more than subcarrier signal SC and locked in phase with color burst signal, a standard-signal discriminator 157 for outputting discrimination signals CC, when input video signal S is the above-mentioned standard signal, in response to signals V and H and SC from synchronizing signal separator 155, a zero-gain signal generator 159 for generating signal FZ correspondent to tap gain 0 of ghost cancelling filter 12, and a selector 158 for selecting on discrimination signal CC either tap gain control signal F from tap gain signal generator 154 or zero gain signal FZ from zero tap gain signal generator 159. Zero gain signal generator 159 is constructed of a resister having the same number of storage places as the number of bits of tap gain control signal F.

Referring to FIG. 5, standard signal discriminator 157 comprises a subcarrier discriminator 181 for receiving subcarrier signal SC from synchronizing signal separator 155 and clocks CK from clock generator 156A, and outputting subcarrier discrimination signals PSC in response to that the level of input signal SC is fixed every period four times longer than that of clock CK, a horizontal synchronizing signal discriminator 182 for receiving the horizontal synchronizing signal H and outputting the horizontal synchronizing discrimination signal PH in response to that the frequency $f_H$ of signal H and the frequency $f_{SC}$ of subcarrier signal SC are in relationship of $f_H = 2 \times fsc/455$, a vertical synchronizing signal discriminator 183 for receiving the vertical synchronizing signal V and outputting the vertical synchronizing signal discrimination signal PF in response to that the frequency $f_F$ which is $\frac{1}{2}$ the frequency $f_v$ of signal V, horizontal synchronizing signal frequency $f_H$, and subcarrier frequency $f_{SC}$ are in relationship of $f_F = f_H/525 = 2 \times fsc/23887$, and an AND circuit 184 for outputting the logical multiplication of PSC, PH and PF as the above-mentioned discrimination signal CC.

Subcarrier discriminator 181 consists of a waveform reshaping circuit 811 for changing signal SC in waveform into signal SSC, a counter 812 for causing signal SSC to delay by four counts of clock CK and outputting gate pulse GSC, and a gate circuit 813 for outputting discrimination signal PSC in response to signal SSC and gate pulse GSC.

Horizontal synchronizing signal discriminator 182 consists of a waveform reshaping circuit 821 for changing signal H in waveform into signal SH, a counter 822 for causing signal SH to delay by 455 counts of gate pulse GSC and outputting gate pulses GH, and a gate circuit 823 for outputting discrimination signal PH in response to signal SH and gate pulse GH.

Vertical synchronizing signal discriminator 183 consists of a waveform reshaping circuit 831 for changing signal V in waveform into signal SV, a counter 832 for causing signal SV to delay by 525 counts of gate pulse GH to signal SV and outputting gate pulse GF, and a gate circuit 833 for outputting discrimination signal PF in response to signal SV and gate pulse GF.

Reference is made to FIGS. 6A through 6D diagramming the timing relationship among signals and pulses. In NTSC system, color burst signal constructed of 8 to 12 cycles of subcarrier signal SC overlies the back porch of horizontal synchronizing signal H. Clock CK (only one pulse shown) is lacked in phase to the front edge, i.h. the first subcarrier signal SC. The first pulse SSCa of signal SSC is input to counter 812, delayed by 4 counts of clock CK, and outputted as the first gate pulse GSCa of gate pulse GSC. If the second pulse SSCb of signal SSC is input at the time points when the input of this pulse GSCa to gate circuit 813 adds, then discrimination pulse PSCa is outputted. If the nth pulse SSCn of signal SSC is input to gate circuit 813 in difference in time from the 4 clock CK counts delayed output of the preceding pulse SSCn-1, the gate operation on gate pulse GSCn-1 results in outputting no discrimination pulse PSCn. Similarly the first pulse SHa of signal SH is input to counter 822 of horizontal synchronizing signal discriminator 182, delayed by 455 counts of gate pulse GSC, and outputted as the first pulse GHa of gate pulse GH to gate circuit 823. Input of the third pulse SHb of signal SH at this time to gate circuit 823 can cause output of discrimination signal PH. It is the same as in the case of FIG. 6B that unless both are coincident, no discrimination signal PH is outputted.

Likewise the first pulse SVa of signal SV is input to counter 832 of vertical synchronizing signal discriminator 183, delayed by 525 counts of gate pulse GH, and outputted as the first pulse GFa of gate pulse GF to gate circuit 833. If the third pulse SVb of signal SV is input at this time to gate circuit 833, discrimination pulse PSC, PH, and PF to AND circuit 184 can result in output of a standard signal discrimination signal CC.

The filter control circuit 15A (FIG. 4) and standard signal discriminator 157 (FIG. 5) are constructed as described above. Thus the standard signal discriminator output (standard signal discrimination signal CC), if at high level (logic 1), causes filter control selector 158 to select tap gain control signal F, and if at low level (logic 0), to select zero gain signal FZ. The selected signal is outputted to digital filter 122 (FIG. 2). In the latter case, the tap gain of digital filter 122 becomes 0, and hence digital video signal DS input to adder 123 undergoes no ghost cancel processing and itself is outputted as signal DE from there. Non-standard TV signals are displayed as it is on TV screen without occurrence of picture distortion.

In the embodiment described above, GCR signal detector 151 extracts vertical synchronizing signal V as time base and hence on reception of TV signals including no GCR signals DG can output, instead of GCR signals DG, horizontal synchronizing detection pulses synchronized with signal V. In this case, discriminator 157 is desired to reduce the permissible time amount of gate operation of gate circuits 813, 823, 833 from two to one period of clock pulse CK in response to GCR signal detection pulse outputted from GCR signal detector 151 so as to raise standard signal discrimination level by narrowing the difference of the above-mentioned pulses PS, PH and PF on time axis.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A ghost canceling circuit comprising:
an A/D converter for covering a received analog video signal into digital video signals, said analog video signal containing vertical and horizontal synchronizing signals and a color subcarrier;
a ghost canceling filter including a variable delay circuit for receiving and delaying digital video data which is to be outputted, a delay value of said variable delay circuit being controlled by delay control signals, a transversal filter for receiving and controlling an output from said variable delay circuit in response to a tap gain thereof, said tap gain of said transversal filter being controlled by tap gain control signals, and an adder for adding an output of said transversal filter to said digital video signals in order to output said digital video data which is to be outputted, a filter control circuit including a timing signal source for generating a set of timing signals in response to said vertical and horizontal synchronizing signals and said color subcarrier contained in said analog video signal, an extractor for extracting associated ghost signals from said digital video signals in response to said timing signals, a tap gain control signal generator responding to said associated ghost signals for generating tap gain control information a delay control signal generator for responding to said associated ghost signal in order to generate and supply said delay control signals to said variable delay circuit, a standard signal discriminator responding to said horizontal and vertical synchronizing signals and said color subcarrier for generating a discrimination signal when said analog video signal is based on a standard broadcasting system, and a setting circuit for transferring said tap gain control information to said transversal filter as said tap gain control signals when said discrimination signal is generated and for changing a value of said tap gain control signals to zero irrespective of said tap gain control information when said discrimination signal is not generated.

2. A ghost cancelling circuit according to claim 1 wherein said digital video signals contains a ghost cancel reference signal having a specified phase relationship to said vertical synchronizing signal contained in said analog video signal and said extractor extracts said associated ghost signals for detecting said ghost cancel reference signal.

3. A ghost cancelling circuit according to claim 1 wherein said extractor outputs a pulse signal having a specified phase relationship to said vertical synchronizing signal of said analog video signal.

4. A ghost cancelling circuit according to claim 1 and a timing signal source for generating clock pulse in phase synchronized with said color subcarrier and said standard signal discriminator includes a locating circuit for locating the positions of said horizontal and vertical synchronizing signals and said color subcarrier of said analog video signal on the time axis.

5. A ghost canceling circuit according to claim 4 wherein said standard signal discriminator including:

a subcarrier discriminator consisting of a delayed-color subcarrier generator for delaying said subcarrier by 4-times the repeating period of said clock pulse to generate a delayed subcarrier, and a first gate circuit for outputting subcarrier discrimination pulse in response to said color subcarrier synchronized with said delayed subcarrier;

a horizontal synchronizing signal discriminator consisting of a delayed-horizontal synchronizing signal generator for delaying said horizontal synchronizing signal by 455-times the repeating period of said delayed subcarrier, and a second gate circuit for outputting a horizontal synchronizing signal discriminating pulse in response to said horizontal synchronizing signal synchronized with said delayed horizontal synchronizing signal;

a vertical synchronizing signal discriminator consisting of a delayed-vertical synchronizing signal generator for delaying said vertical synchronizing signal by 525-times the repeating period of said delayed horizontal synchronizing signal and third gate circuit for outputting a vertical synchronizing signal discriminating pulse in response to said vertical synchronizing signal synchronized with said delayed vertical synchronizing signal; and an AND circuit for outputting a logical multiplication of said subcarrier discriminating pulse, said horizontal synchronizing signal discriminating pulse, and said vertical synchronizing signal discriminating pulse.

* * * * *